(12) United States Patent
Huang

(10) Patent No.: US 8,340,986 B2
(45) Date of Patent: Dec. 25, 2012

(54) METHODS AND SYSTEMS FOR PROVIDING DEFERRED ANNUITIES WITH AN INCOME RESET FEATURE

(75) Inventor: Dylan W. Huang, New York, NY (US)

(73) Assignee: New York Life Insurance Company, New York, NY (US)

( * ) Notice: Subject to any disclaimer, the term of this patent is extended or adjusted under 35 U.S.C. 154(b) by 0 days.

(21) Appl. No.: 13/106,507

(22) Filed: May 12, 2011

(65) Prior Publication Data

US 2012/0290331 A1    Nov. 15, 2012

(51) Int. Cl.
*G06Q 40/00*    (2012.01)
(52) U.S. Cl. ............................... 705/4; 705/35
(58) Field of Classification Search ............... 705/4, 35
See application file for complete search history.

(56) References Cited

U.S. PATENT DOCUMENTS

| | | | |
|---|---|---|---|
| 7,080,032 B2 * | 7/2006 | Abbs et al. ............. | 705/35 |
| 7,676,414 B1 * | 3/2010 | Abbs et al. ............. | 705/35 |
| 7,801,792 B2 * | 9/2010 | Tatro et al. ............. | 705/36 R |
| 7,877,306 B2 * | 1/2011 | Michalowski et al. ... | 705/35 |
| 7,877,307 B2 * | 1/2011 | Tatro et al. ............. | 705/35 |
| 7,885,834 B2 * | 2/2011 | Weiss ................... | 705/4 |
| 7,949,584 B2 * | 5/2011 | Weiss ................... | 705/35 |
| 8,065,170 B2 * | 11/2011 | Weiss ................... | 705/4 |
| 2002/0165740 A1 * | 11/2002 | Saunders ............... | 705/4 |
| 2009/0063203 A1 * | 3/2009 | Baiye .................... | 705/4 |
| 2009/0076861 A1 * | 3/2009 | Saunders ............... | 705/4 |
| 2009/0299773 A1 * | 12/2009 | Gore et al. ............. | 705/4 |
| 2010/0138245 A1 * | 6/2010 | Baiye .................... | 705/4 |
| 2010/0312584 A1 * | 12/2010 | Bradshaw et al. ...... | 705/4 |
| 2011/0004492 A1 * | 1/2011 | Bradshaw et al. ...... | 705/4 |
| 2011/0004493 A1 * | 1/2011 | Bradshaw et al. ...... | 705/4 |
| 2011/0066453 A1 * | 3/2011 | Tatro et al. ............. | 705/4 |
| 2011/0099035 A1 * | 4/2011 | Baiye .................... | 705/4 |
| 2011/0119096 A1 * | 5/2011 | Tatro et al. ............. | 705/4 |
| 2011/0131070 A1 * | 6/2011 | Weiss ................... | 705/4 |

\* cited by examiner

*Primary Examiner* — Jagdish Patel
*Assistant Examiner* — Sara C Hamilton
(74) *Attorney, Agent, or Firm* — Seth H. Ostrow; Ostrow Kaufman LLP

(57) ABSTRACT

Methods and corresponding systems are provided for providing and administering deferred annuities with an annuity reset feature that provide periodic income payments to an annuitant for a term beginning at a start date. The methods include the step or steps of: receiving annuity information for an annuitant; determining at a first date one of a purchase price and an amount of at least one income payment due to the annuitant at the start date. The purchase price or the amount of at least one income payment due the annuitant includes a fee for the annuity reset feature that resets at least one variable of the annuity at a reset date later than the first date if the at least one variable of the annuity at the reset date is more beneficial to the annuitant than at least the first date; and offering the annuity with the reset feature to the annuitant.

16 Claims, 4 Drawing Sheets

METHODS AND SYSTEMS FOR PROVIDING DEFERRED ANNUITIES WITH AN INCOME RESET FEATURE

RELATED APPLICATIONS

The present application is related to the following commonly owned U.S. Patent Applications:

U.S. patent application Ser. No. 12/939,929, entitled "System And Method For Allocating Assets Among Financial Products In An Investor Portfolio", filed on Nov. 4, 2010, and U.S. patent application Ser. No. 13/045,305, entitled "System And Method For Providing Income Payments To An Investor", filed on Mar. 10, 2011, the disclosures of which are hereby incorporated by reference in their entirety.

BACKGROUND OF THE INVENTION

The present application relates to methods and systems for providing deferred annuities and other insurance products.

Annuities are generally contracts or products that provide income or other payments for a fixed or variable period of time in exchange for one or more premium payments. Annuities generally have two distinct phases: the accumulation phase and the annuity or income phase. During the accumulation phase, the annuitant pays a premium, which may be in the form of a lump sum premium or a series of premium payments. During the income phase, the insurance company or any other provider of the annuity makes income payments to the annuitant for the stated term of the annuity contract, e.g., for a fixed term or for the life of the annuitant. The income payments may begin immediately or may be deferred for a stated period of time. The amount of the income payment will generally vary based on, among other things, the amount of the premium payment, the amount of time that income payments are deferred, the duration of the income payments, mortality rates and other actuarial data, and the interest rate.

As attractive as annuities may be, annuities have drawbacks that may make them less desirable investment options for some individuals. For example, for a fixed rate deferred annuity the interest rate is locked in at the time the annuity is purchased. When interest rates are relatively low, potential purchasers may be disincentivized to purchase annuities at the thought of locking in their income payments using a low interest rate. Conversely, potential purchasers may expect interest rates to increase at a later date and thus pursue other investments rather than annuities. Similarly, potential purchases may not want to be locked into other variables that factor into the calculation of their income payments, figuring those may possibly change in the interim as well.

Accordingly, there is a need for methods for providing annuities and annuity options that are not so limited and that avoid or minimize these problems.

SUMMARY OF THE INVENTION

Accordingly, a method and corresponding system for providing a deferred annuity are described herein that solve some or all of the problems identified above. In some aspects of the invention, the method includes receiving annuity information for an annuitant, the annuity providing periodic income payments to the annuitant for a term beginning at a start date, and determining at a first date, with a computing device, one of a purchase price and an amount of at least one income payment due to the annuitant at the start date, the one of the purchase price and the amount of at least one income payment due the annuitant including a fee for an annuity reset feature that resets at least one variable of the annuity at a reset date later than the first date if the at least one variable of the annuity at the reset date is more beneficial to the annuitant than at least the first date. The annuity is offered with the reset feature to the annuitant. In at least one embodiment, the reset feature is provided as an optional rider to the annuity.

In at least one embodiment, the reset feature resets the at least one variable of the annuity periodically if the at least one variable of the annuity at a later periodic reset date is more beneficial to the annuitant than at a previous reset date. In at least one embodiment, the reset feature resets the at least one variable of the annuity annually on an anniversary of the annuity.

In at least one embodiment, the at least one variable of the annuity that is reset comprises the amount of the income payments due the annuitant at the start date. The income payment amounts may be reset by applying the then current interest rate at the time of the reset if such interest rate is higher than it had been at the first time.

In at least one embodiment, the fee is applied to one or more starting income payments.

In at least one embodiment, the annuity allows the annuitant to pay the purchase price of the annuity at any time and in any amount up until the start date, the method further comprising determining an amount of at least one income payment due the annuitant at a date later than the first date based on an amount and a frequency of premium payments made by the annuitant.

In at least one embodiment, the method further includes issuing the annuity with the reset feature, determining at a reset date whether at least one variable of the annuity is more beneficial to the annuitant than at least the first date, and resetting at least one variable of the annuity to the at more beneficial at least one variable of the annuity.

In at least one embodiment, the variable of the annuity comprises an amount of the income payments due the annuitant at the start date and wherein determining whether the at least one variable of the annuity is more beneficial to the annuitant comprises recalculating the amount of the income payment due the annuitant at the start date based on an age of the annuitant at the reset date and a remaining term of a deferral period associated with the annuity at the reset date.

In at least one embodiment, a method and a corresponding system is provided that includes receiving annuity information for an annuitant, the annuity providing annual income payments to the annuitant for a term beginning at a start date, and determining at a first date, with a computing device, one of a purchase price and an amount of at least one income payment due to the annuitant at the start date, the one of the purchase price and the amount of the at least one income payment due the annuitant including a fee for an annuity reset feature that resets annually at a reset date later than the first date the amount of the at least one income payment due the annuitant at the start date if the amount of the at least one income payment due the annuitant computed at the reset date is greater than the amount of the income payment due the annuitant computed at the first date or a previous reset date. The annuity with the reset feature is then issued. At the reset date, the amount of the income payments due the annuitant at the start date is recalculated based on an age of the annuitant at the reset date and a remaining term of a deferral period associated with the annuity at the reset date. The amount of the income payment due the annuitant at the start date is reset when the recalculated amount is greater than the amount of the income payment due the annuitant computed at the first date or a previous reset date.

Additional aspects of the present invention will be apparent in view of the description that follows.

DETAILED DESCRIPTION OF THE INVENTION

Figure 1:
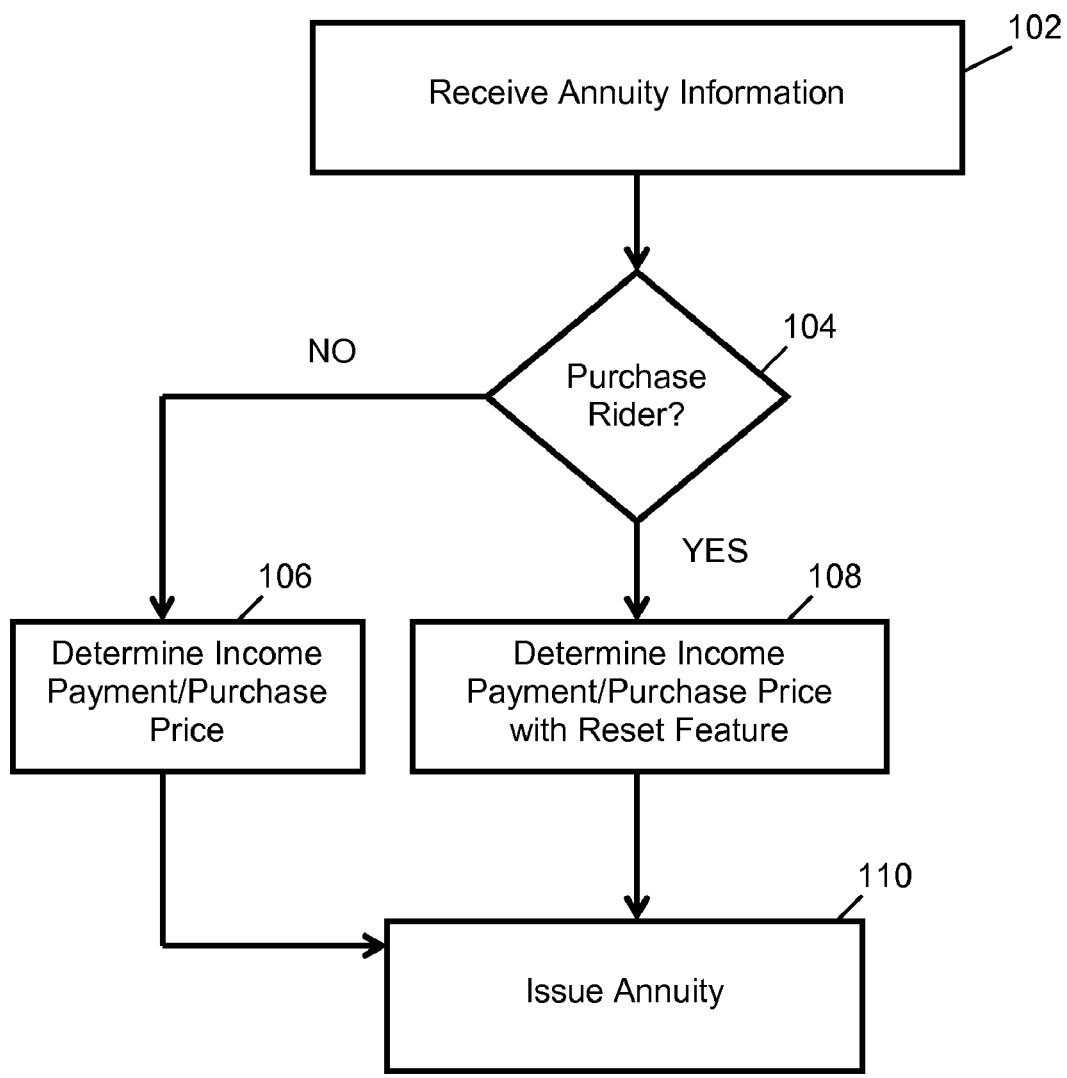
FIG. 1 is a flow diagram of a method for providing deferred annuities with an income reset according to at least one embodiment of the methods disclosed herein.

The present application generally provides systems and methods for providing deferred income or other types of annuities with an income reset feature. This feature may be included with the annuity or may be provided as an optional rider with the annuity. The income reset feature is generally paid for with a fee that may be in the form of a one or more reduced income payments or an explicit fee. Although the methods and systems disclosed herein may be discussed by way of example primarily with regard to certain types of annuities, such as deferred income annuities, it is understood that the income reset feature discussed herein may be applied to other types of annuities, including immediate, fixed rate and/or term, variable rate, for the life of the annuitant, etc. Moreover, even though the methods and systems are discussed as having an income reset feature, other variables may be reset as well, including the interest rate, mortality data, etc.

Generally, deferred income annuities are contracts under which income payments are made to an annuitant beginning at an income start date, for a defined period of time, in exchange for a purchase price or a premium. The income start date may be set at a certain number of years after then annuitant purchases the annuity or when the annuitant achieves a certain age. The period of time that income payments may be made to the annuitant may be a fixed number of periodic payments, such as for 1, 2, 3, ..., 10 annual income payments, or an uncertain number of periodic payments, such as annual payments for the life of the annuitant. The purchase price may be paid by the annuitant in a lump sum or in a series of periodic premium payments.

The amount and the frequency of the premium payments may be fixed at the time the annuity is purchased. Alternatively, the annuity may provide the annuitant the opportunity or the flexibility to make periodic premium payments at any time and/or in any amount up until the income start date. For example, the annuity may have a purchase price associated therewith that the annuitant should pay prior to the income start date. In this respect, the annuitant may make premium payments at his or her choosing until the income start date. Since the amount and the timing of the payments are uncertain, the amount of the income payment may be also uncertain. In this instance, the amount of the income payment may be computed periodically as the annuitant makes premium payments and/or at the income start date based on the amount and the timing of the premium payments that the annuitant actually made. The annuitant may desire a certain income payment at the income payment start date. In this instance, the amount of premium that must be paid to achieve the desired income payment may also be computed periodically and communicated to the annuitant.

In at least one embodiment, the deferred income annuity is provided with an income reset feature. The reset feature specifically addresses the concern that some individuals have of purchasing an annuity that locks them into terms at the time of purchase that may be less beneficial than terms available at a later time. The income reset feature, whether included in the annuity or added to the annuity as a rider, resets at a later time the amount of the income payment due at the income start date should the variable or variables for computing the income payment be more beneficial to the annuitant at the later time. As noted above, the reset feature may reset any variable for computing the amount of the income payment due at the income start date should any of the variables be more beneficial to the annuitant at the later time. Therefore, if the annuity provides flexibility with regard to the amount and the timing of the premium payments to be made by the annuitant, then the variable or variables used to compute the amount of the income payment themselves may be reset. The income payment may be reset as a result of or based on a change in any variable for computing the income payment due at a particular income start date. For example, the income payment may be reset based on a beneficial change in the replacement cost of the annuity, or in publicly available data on mortality rates and/or interest rates/yields.

It is understood that the specific details or requirements of the reset may vary. For example, the reset may occur automatically when certain conditions are met or when the annuitant specifically elects to reset the amount of the income payments. There may also be limits on when and to the extent that resets may be taken. For example, the reset may be available at specific times, such as on an anniversary of the annuity during the deferral period. Similarly, the number of resets that may be taken may be limited, such as to one or more, fewer than all, or specific ones of the anniversaries within the deferral period.

As an illustrative example, a 65-year old male may purchase a 10 year deferred income annuity for a $100,000 premium payment, which at that time purchases $16,000 in annual income. At the first anniversary of the annuity the income payment may be recalculated to determine if changes in the applicable variables for computing the income payment would result in a higher income payment at the given income start date. In this instance, the annuitant at the first anniversary is 66 years old, the premium payment is still $100,000, but the particular income start date amounts to a 9 year deferral. Assuming that one or more of the relevant variables, such as interest, mortality, etc., have changed such that recalculation of the income payment at the first anniversary results in a higher income payment of $16,050 per year, the annual income due the annuitant at the income start date may be reset to the higher income payment amount. The reset amount preferably serves as a floor for future reset opportunities. For example, on the second anniversary of the annuity the income payment may be recalculated based on the annuitant being 67 years old and the annuity having an 8 year deferral period. In this instance, the income may be reset only if the income payment computed at the second anniversary is greater than the income payment computed at the first anniversary.

Referring to FIG. 1, a method for providing deferred annuities with an income reset feature according to at least one embodiment of the methods disclosed herein begins at 102 by receiving from a potential annuitant information relevant for issuing an annuity. The information may include personal information, such as the annuitant's name, date of birth, age, address, occupation, health issues or history, etc. The information may also include annuity specific variables, such as whether the annuitant is interested in purchasing a certain income or paying a certain premium, the deferral period, etc. If the income reset feature is provided as an optional feature, then a determination may be made at 104 as to whether the annuitant is interesting in purchasing the income reset rider. If at 104 the income reset rider is not purchased, the purchase price or the income payment may be determined at 106 based on the information received without the cost of the income reset feature factored into either the income payment or the purchase price. If, however, at 104 the income reset rider is purchased or otherwise included in the deferred income annuity, then the purchase price or the income payment may be determined at 108 taking into account the cost of the income reset feature. The purchase price and/or the amount of the income payments are computed based on the value of the relevant variables at that time, including mortality data for the particular annuitant, the applicable interest rate, the amount of the deferral period, the desired income payments and/or the purchase price, respectively, the amount and the frequency of the premium payments, etc. As noted above, the fee for the income reset feature may be an explicit fee or may be subtracted from the income due at the start of income payments. In the first instance, the purchase price calculated includes an additional charge for the income reset feature. In the later instance, one or more of the starting income payments are computed to include a charge for the income reset feature. Once the premium and/or the payments are computed the annuity may be offered to the annuitant and/or issued at 110.

It is understood that the fee for the variable reset option or feature may be set as a constant per amount of annuity or may be computed in a variety of ways. In at least one embodiment, the fee is computed based on, among other factors known to those of skill in the art, mortality data, length of the deferral period, interest rate expectations going forward, and cost for hedging interest rate risks. As those of actuarial skill will recognize, these factors may be used to compute the current value of the risk that income payments will be increased during the deferral period so that the fee for the variable reset option will, across a group of customers, fully or partially offset the added cost of providing the option to members of the group. The interest rate risk may take into account, among other possible factors known to those of skill in the art, the implied volatility of interest rates, volatility for corporate bond spreads, and implied volatility of corporate bond spreads. It is understood that various hedging instruments will have risks that differ. For example, a AAA rated corporate bond will have less risk associated therewith than with BBB rated corporate bonds. The cost of the option attributed to the risk will therefore vary based on the type and quality of the hedging instrument.

Figure 2A:
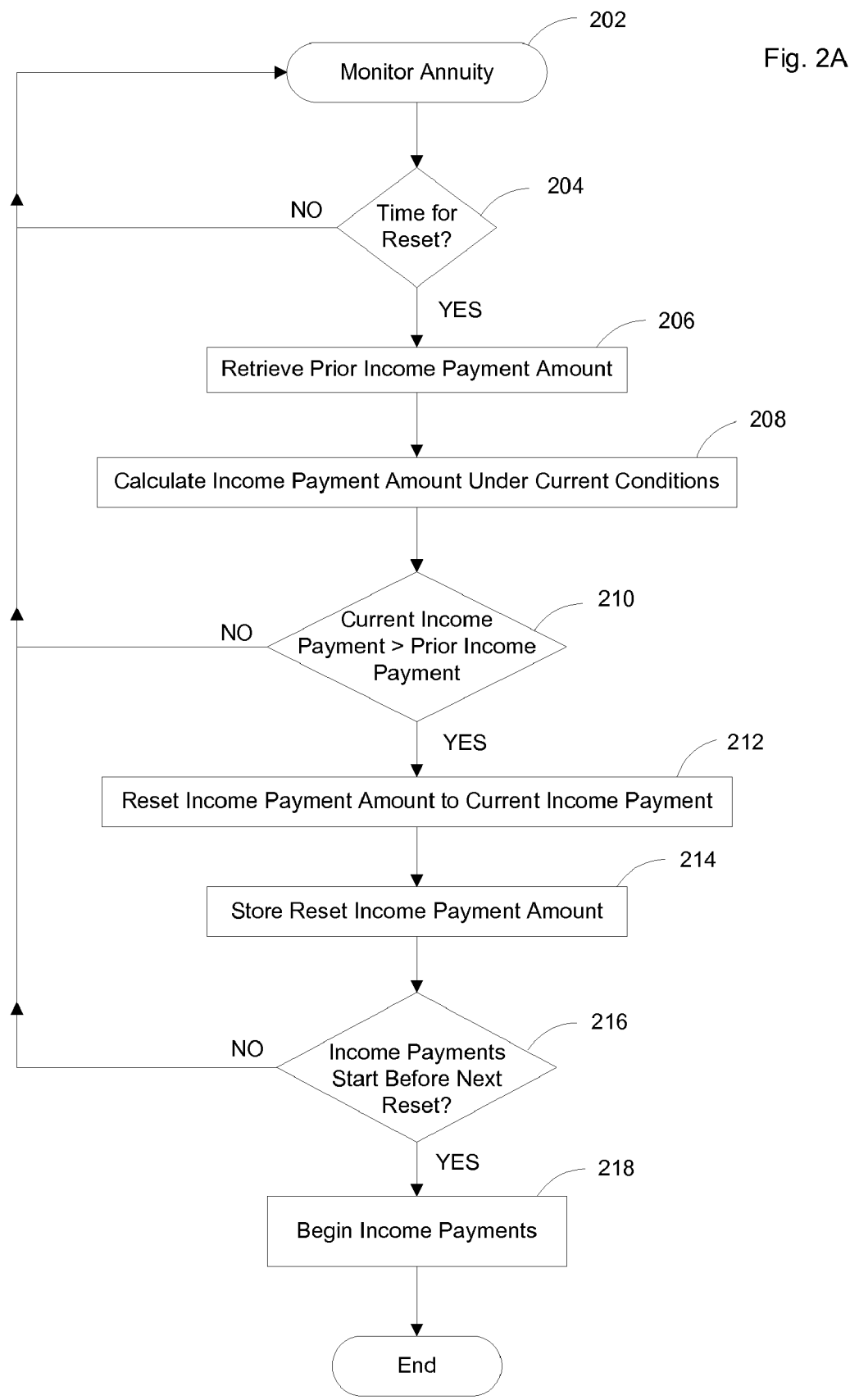
FIG. 2A is a flow diagram of a method for administering a deferred annuity with an income reset according to at least one embodiment of the methods disclosed herein.

Referring to FIG. 2A, once the annuitant purchases the annuity and the annuity issues, the provider of the annuity monitors the annuity during the deferral period at 202. The type and the extent of the monitoring will vary depending on the terms/limitations of the annuity and the reset feature. In one embodiment, monitoring includes determining at 204 if sufficient time has passed between the purchase of the annuity and/or a previous income reset. For example, if the income reset feature is available annually at the anniversary of the annuity, then the provider determines if the then current date is an anniversary of the annuity.

When the income reset is available, the provider of the annuity may recalculate or otherwise determine with the system the amount of the income due to the annuitant at the start date, taking into account the changes in the variables for computing the amount of the income payment at that given time. The variables for computing the income payment may include the premium paid or the total premium to be paid, the amount of the time remaining in the deferral period, the age of the annuitant, the replacement value of the annuity under those circumstances, the applicable interest rate or yield, mortality data, etc., at that given time. The provider generally determines the amount of income due at the start date by retrieving at 206 the amount of the income payment determined previously from a database storing such values. The provider then calculates the income payment amount under the then current conditions at 208. If at 210 the current income payment or any of the variables is determined to be greater than or otherwise more beneficial to the annuitant than the prior income payment or variable, then the prior income payment may be reset at 212 to the current income payment or the more beneficial variable. The reset income payment amount or reset variable is then stored in the database as the new current income payment amount at 214. Otherwise, the prior income payment or the previously set variable or variables remain the same. The system determines at 216 whether income payments are due to start before the next reset and generally repeats the steps discussed herein for each subsequent reset until the income payment or other variable for the particular annuity being monitored can no longer be reset and payments begin at 218.

Figure 2B:
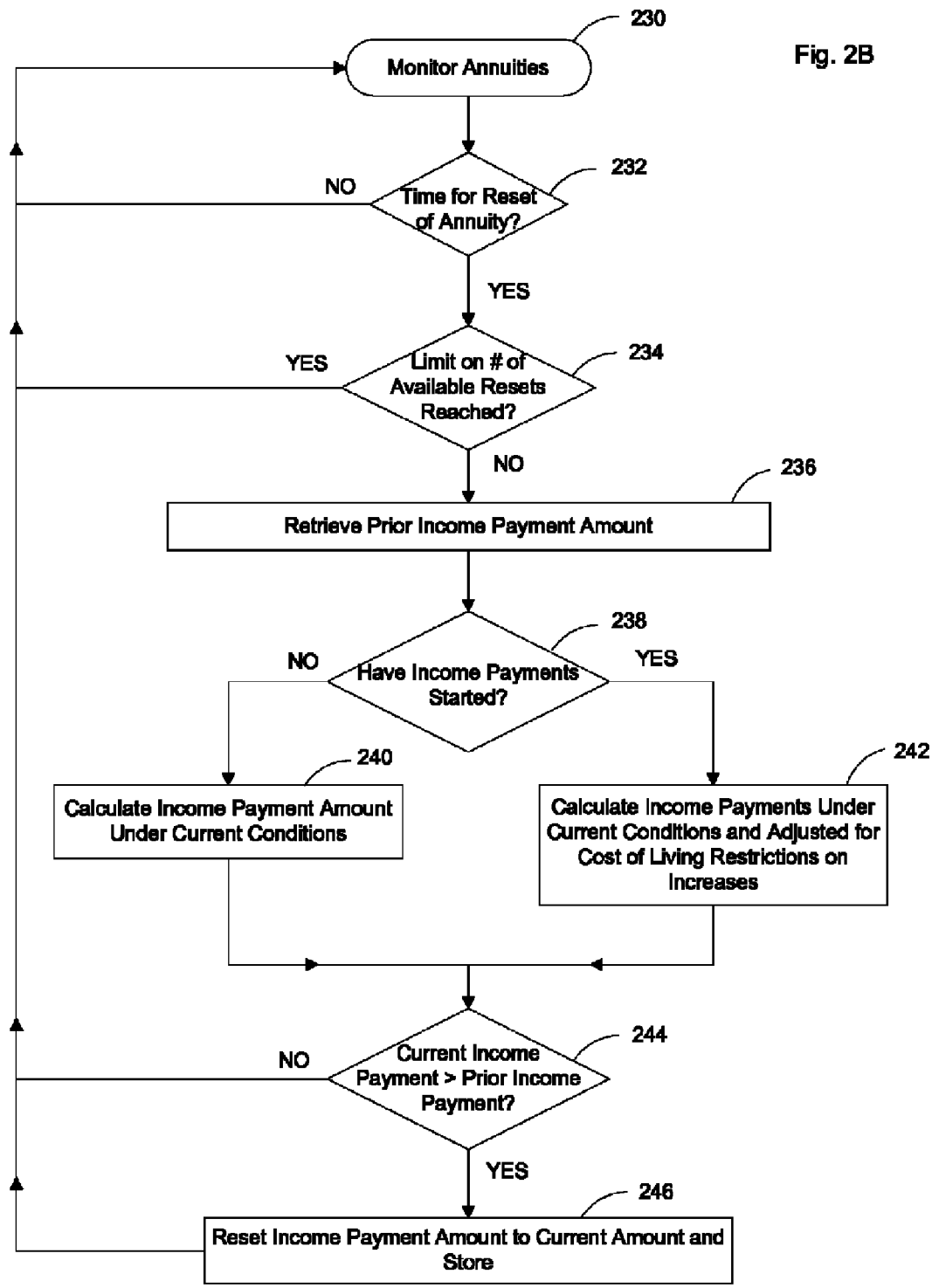
FIG. 2B is a flow diagram of a method for administering a plurality of deferred annuities with an income reset according to other embodiments of the methods disclosed herein.

Referring to FIG. 2B, the system may be operable to administer annuities having additional limitations with regard to the reset. For example, there may be a limit on the number of income payment resets that may be applied to any given annuity, which limit may be preset by the annuity provider to help make the risks more predictable and manageable and to more accurately price the charge for the fee for the variable reset option as described above. Also, the resets may be limited to occur only during the deferral period or may be available after income payments have begun. In this instance, the provider of the annuity monitors annuities it has provided at 230. In one embodiment, the system monitors at least one annuity to determine if it is time for a reset and continue monitoring the annuity or annuities until such time as a reset is available. If at 232 it is determined that the reset is available, the system may determine if any other conditions to the reset have been satisfied. For example, if there is a limit on the number of resets available, the system may at 234 determine if the limit on the number of available resets has been reached.

When the reset is available, the provider thereafter determines the amount of income due to the annuitant at the start date by retrieving at 236 the amount of the income payment determined previously. Resets may be available after the deferral period and different rules may be applicable for resets occurring during the deferral period than those occurring after the deferral period. In this instance, the system may at 238 determine whether income payments have started and thereafter apply the appropriate rules based on whether income payments have begun. For instance, during the deferral period the system may calculate the income payment amount under the then current conditions at 240 and after the deferral period calculate the income payment amount under the then current conditions with an adjustment to account for cost of living restrictions on increases at 242. In either instance, the system determines at 244 if the then current income payment or any of the variables, with or without adjustments, is greater than or more beneficial to the annuitant than the prior income payment or variable, and resets the prior income payment at 246 to the then current income payment or to the more beneficial variable accordingly and stores such new current income payment amount in the annuity database. The system generally repeats the steps discussed herein for each subsequent reset and for each annuity being monitored.

Figure 3:
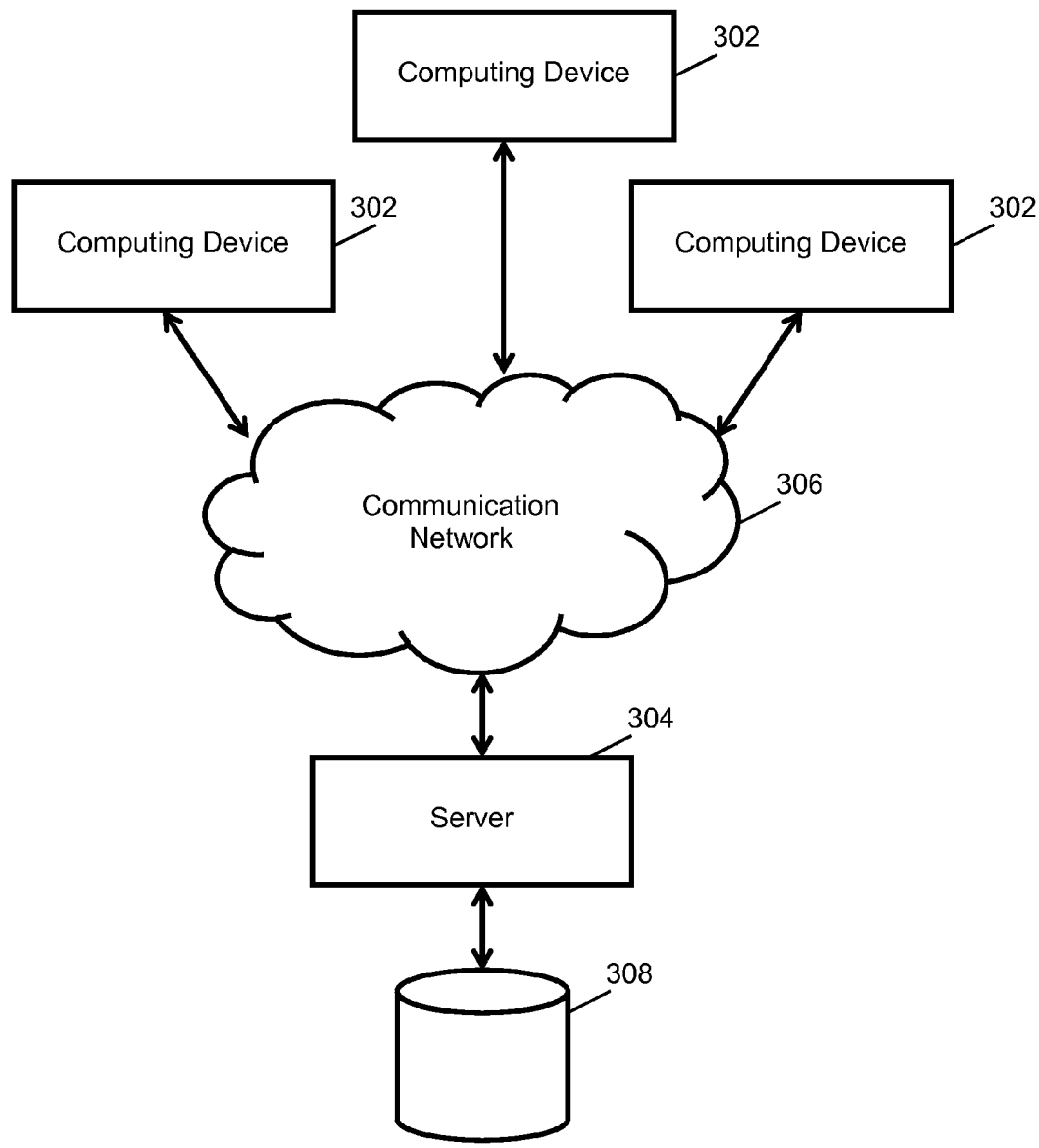
FIG. 3 is a block diagram of a system for providing deferred annuities with an income reset feature according to at least one embodiment of the systems disclosed herein.

Referring to FIG. 3, a system for providing deferred annuities with an income reset feature is provided that includes at least one computing device 302 having a processor and associated computer memory, a display device, and an input device. The computing device 302 may be may a personal computer or special purpose computer having software associated therewith that when executed performs or assist in performing the methods disclosed herein, including the steps of providing deferred annuities with an income payment or other variable reset feature and administering such annuities. The computing device 302 may also be coupled over a communication network 306, such as a local area network (LAN), a wide area network (WAN), the Internet, the World Wide Web (WWW), a wireless network, or a combination thereof, to at least one server 304. The software may therefore be installed locally at the computing device 302, remotely at the server 304, or a combination thereof. For example, the client device 304 may include a browser application that accesses and displays for a user a web interface that includes therein form elements, such as text boxes, radio buttons, drop down lists, etc., for the user to input information relevant to provide the annuities disclosed therein. The web interface may further include one or more buttons that when selected cause the information provided therein to be communicated to the server 308. Upon receipt of the information, server 308 may compute the variables of the annuity, such as the purchase price and/or the amount of the income payment, based on the information provided and other variables, such as mortality data, interest rates, etc., stored on a database 308. When the terms of the annuity are accepted, the information associated with the annuity, including the annuitant's personal information, the annuity specific information, such as the purchase date, the deferral period, the amount and the frequency of premium payments made or to be made, the amount of the income payments due and/or any variables for computing the amount of the income payment, the start date for the income payments, etc., are stored in the database or databases to administer the annuity as disclosed herein.

While the foregoing invention has been described in some detail for purposes of clarity and understanding, it will be appreciated by one skilled in the art, from a reading of the disclosure that various changes in form and detail can be made without departing from the true scope of the invention.

What is claimed is:

1. A method for providing a deferred annuity comprising:
receiving annuity information for an annuitant, the annuity providing periodic income payments to the annuitant for a term beginning at a start date;
determining at a first date, by a computing device, one of a purchase price and an amount of at least one income payment due to the annuitant at the start date, the one of the purchase price and the amount of at least one income payment due the annuitant including a fee for an annuity reset feature that resets at least one variable of the annuity at a reset date later than the first date when the at least one variable of the annuity at the reset date is more beneficial to the annuitant than at least the first date;
issuing the annuity with the reset feature to the annuitant;
determining periodically at the reset date whether the at least one variable of the annuity is more beneficial to the annuitant than the first date or at a previous reset date; and
resetting the at least one variable of the annuity to the more beneficial at least one variable of the annuity.

2. The method of claim 1, wherein the reset feature is provided as an optional rider to the annuity.

3. The method of claim 1, wherein the reset feature resets the at least one variable of the annuity annually on an anniversary of the annuity.

4. The method of claim 1, wherein the at least one variable of the annuity that is reset comprises the amount of the income payments due the annuitant at the start date.

5. The method of claim 4, wherein the fee is applied to one or more starting income payment.

6. The method of claim 1, wherein the annuity allows the annuitant to pay the purchase price of the annuity at any time and in any amount up until the start date, the method further comprising determining an amount of at least one income payment due the annuitant at a date later than the first date based on an amount and a frequency of premium payments made by the annuitant.

7. The method of claim 1, wherein the variable of the annuity comprises an amount of the income payments due the annuitant at the start date and wherein determining whether the at least one variable of the annuity is more beneficial to the annuitant comprises recalculating the amount of the income payment due the annuitant at the start date based on an age of the annuitant at the reset date and a remaining term of a deferral period associated with the annuity at the reset date.

8. A method for providing a deferred annuity comprising:
receiving annuity information for an annuitant, the annuity providing annual income payments to the annuitant for a term beginning at a start date;
determining at a first date, by a computing device, one of a purchase price and an amount of at least one income payment due to the annuitant at the start date, the one of the purchase price and the amount of the at least one income payment due the annuitant including a fee for an annuity reset feature that resets annually at a reset date later than the first date the amount of the at least one income payment due the annuitant at the start date when the amount of the at least one income payment due the annuitant computed at the reset date is greater than the amount of the income payment due the annuitant computed at the first date or a previous reset date;
issuing the annuity with the reset feature;
recalculating periodically at the reset date the amount of the income payments due the annuitant at the start date based on an age of the annuitant at the reset date and a remaining term of a deferral period associated with the annuity at the reset date; and
resetting the amount of the income payment due the annuitant at the start date when the recalculated amount is greater than the amount of the income payment due the annuitant computed at the first date or a previous reset date.

9. A system for providing a deferred annuity, the system comprising at least one computing device having software associated therewith that when executed causes the at least one computing device to perform a method comprising:
receiving annuity information for an annuitant, the annuity providing periodic income payments to the annuitant for a term beginning at a start date;
determining at a first date, by a computing device, one of a purchase price and an amount of at least one income payment due to the annuitant at the start date, the one of the purchase price and the amount of at least one income payment due the annuitant including a fee for an annuity reset feature that resets at least one variable of the annuity at a reset date later than the first date when the at least one variable of the annuity at the reset date is more beneficial to the annuitant than at least the first date;

issuing the annuity with the reset feature to the annuitant;

determining periodically at the reset date whether the at least one variable of the annuity is more beneficial to the annuitant than the first date or at a previous reset date; and resetting the at least one variable of the annuity to the more beneficial at least one variable of the annuity.

10. The system of claim 9, wherein the reset feature is provided as an optional rider to the annuity.

11. The system of claim 9, wherein the reset features resets the at least one variable of the annuity annually on an anniversary of the annuity.

12. The system of claim 9, wherein the at least one variable of the annuity that is reset comprises the amount of the income payments due the annuitant at the start date.

13. The system of claim 12, wherein the fee is applied to one or more starting income payment.

14. The system of claim 9, wherein the annuity allows the annuitant to pay the purchase price of the annuity at any time and in any amount up until the start date, the method further comprising determining an amount of at least one income payment due the annuitant at a date later than the first date based on an amount and a frequency of premium payments made by the annuitant.

15. The system of claim 9, wherein the variable of the annuity comprises an amount of the income payments due the annuitant at the start date and wherein determining whether the at least one variable of the annuity is more beneficial to the annuitant comprises recalculating the amount of the income payment due the annuitant at the start date based on an age of the annuitant at the reset date and a remaining term of a deferral period associated with the annuity at the reset date.

16. The system of claim 15, the amount of the income payment due the annuitant at the start date further computed based on at least one of mortality data, interest rates, and a replacement cost at the reset date.

* * * * *